Nov. 14, 1933.     P. V. MALLOY     1,935,248
APPARATUS FOR AND METHOD OF MANUFACTURING GLASS STEMS
Filed March 10, 1931
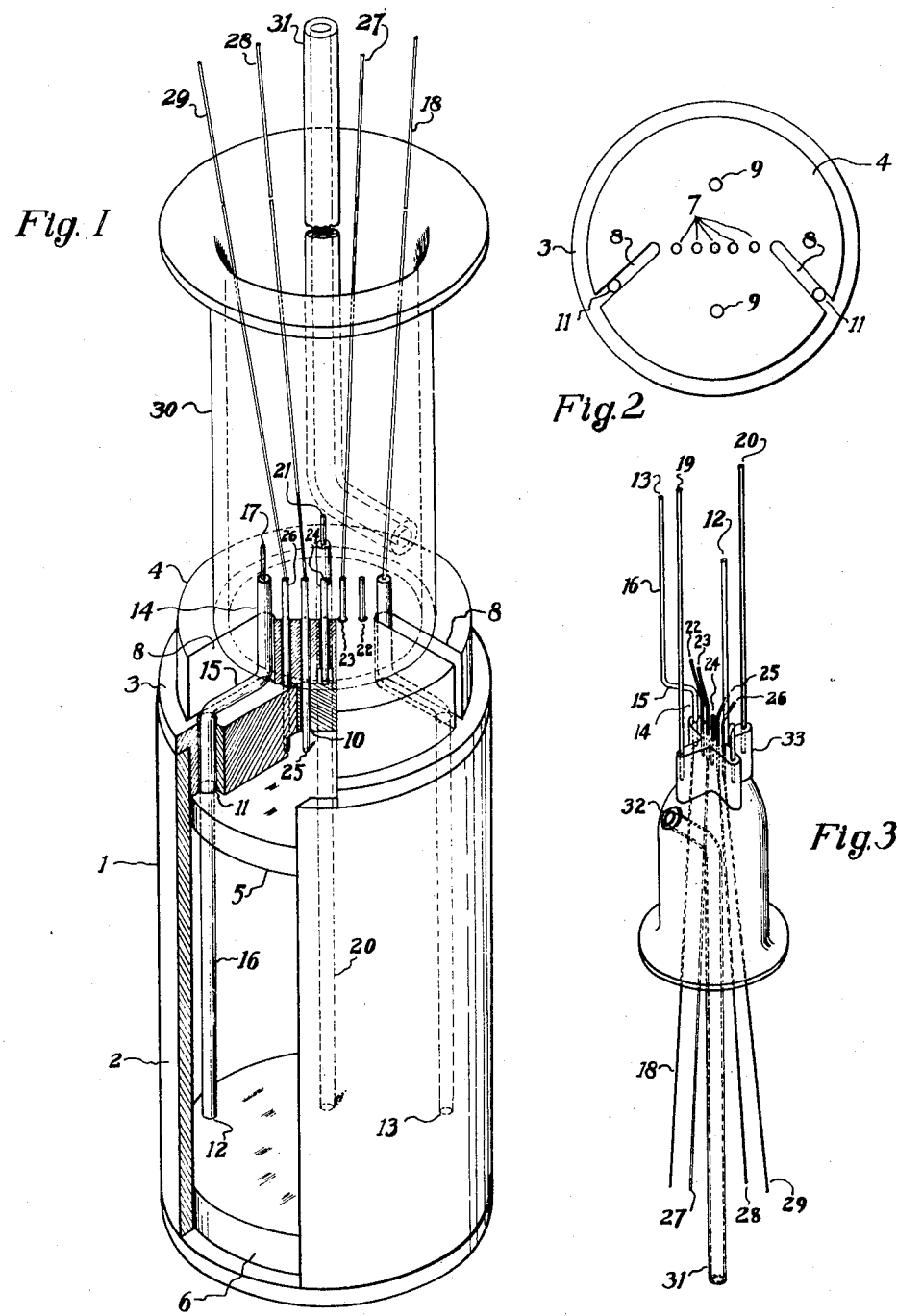
Paul V. Malloy INVENTOR
BY
Elmer J. Goin
ATTORNEY Patented Nov. 14, 1933

1,935,248

UNITED STATES PATENT OFFICE 1,935,248

APPARATUS FOR AND METHOD OF MANUFACTURING GLASS STEMS

Paul V. Malloy, West Newton, Mass., assignor to The Raytheon Production Corporation, Newton, Mass., a corporation of Delaware Application March 10, 1931. Serial No. 521,479

9 Claims. (Cl. 250—27.5)

This invention relates to an apparatus for and a method of manufacturing that part of a vacuum tube known as the stem.

Among the objects of my invention is to devise a method of constructing the stem of a vacuum tube which shall simplify the manufacture of said tubes and also eliminate several causes of breakage of the stem during manufacture.

Another object is to produce an apparatus for carrying out my novel method.

The foregoing and other objects of my invention will be best understood from the following description of an exemplification thereof, reference being had to the accompanying drawing wherein Figure 1 is a perspective view of an exemplification of my novel apparatus showing a stem block partly broken away and also showing the various parts of the stem assembled on this stem block ready to be sealed together.

Figure 2 is a top view of the stem block.

Figure 3 is a perspective view of a completed stem.

In the manufacture of vacuum tubes the lead in and support wires for the various electrodes are first sealed into one end of a glass tubular structure called the "stem." That portion of the stem in which these wires are sealed is called the "press." In order to keep the press within reasonable limits of size it is usually necessary to bend some of the support and lead-in wires. Heretofore these wires have been sealed into the press straight and after the glass of the press which is formed around these wires in a plastic state, had cooled sufficiently, the wires were bent in the desired direction. This bending of the wires while sealed in the press is a rather difficult process and also usually produces strains on the glass of the press so that breakage is very likely to occur. These strains also produce microscopic cracks which, while not apparent to the eye, produce a slow leakage of air into the tube so that after the tube is completed it is found to contain enough air to render it useless.

In accordance with my invention I eliminate these difficulties by bending the wires into their desired final shape before they are sealed in the press. By supporting all of the wires in their requisite relative position, the glass of the stem may be formed around these wires resulting in a structure in which all of said wires are in a position ready to receive the electrode structure to be mounted on them.

Referring to Figure 1 a stem block disclosing one embodiment of my invention is shown. This stem block consists of a cylindrical member 2 at the upper end of which is mounted a block 3. On the upper side of block 3 is a second block 4 and on the under side of block 3 is a plate 5.

The bottom of member 2 is closed by a member 6. The block 4 is drilled with a row of five holes 7 along one diameter of said block. At each end of said row is provided a slot 8 extending entirely through the block 4 at an angle to the said row of holes 7. Two holes 9 are drilled in said block 4 along a line displaced about 90 degrees from said row of holes 7. The block 3 is drilled with holes in line with each of the holes 7 except the center one. A further hole 11 is provided in block 3 near the outer end of each slot 8. In line with each of the holes 9 block 3 has a corresponding hole (not shown). Plate 5 is provided with a hole in line with each of the holes 9 and 11. The entire stem block 2 is adapted to be mounted in an automatic stem machine such as that shown, for example, in the patent of John A. Spencer No. 1,896,599.

The various holes described above are for the purpose of supporting the various wires to be sealed in the press in their desired relative positions. In order to produce a stem, first the various wires are placed in their respective supporting holes. Standards of a hard resilient metal such as hard nickel are used. The tube structure necessitates that two of these standards 12 and 13 be bent through two right angles. Each wire, as bent, comprises one portion 14, a short section 15 at right angles thereto, and a long supporting portion 16 parallel to portion 14. The end of wire 12 has welded to it a short piece of Dumet wire 17 which is usually made of a nickel iron wire covered with copper. The end of wire 13 has a long piece of Dumet wire 18 welded to it. The wire 18 is adapted to provide an external electrical connection to wire 13. The other two standards 19 and 20 are used straight and each one also has a short piece of Dumet wire 21 welded to one end thereof. Besides the four supporting standards 12, 13, 19 and 20 five wires 22 to 26 inclusive are used. The latter five wires are considerably thinner than the wires 12, 13, 19 and 20. Each wire 23, 25 and 26 has a long piece of Dumet wire 27, 28 and 29 respectively for the same purpose as wire 18.

The five wires 22 to 26 are originally straight and are assembled in the row of holes 7. The wire 24 is shorter than the other five wires and is inserted in the middle hole of row 7. One end of the wire 24 rests on the top of block 3.

The other wires 22, 23, 25 and 26 project through the holes 7 and 10 and rest on the top of plate 5. The wires 19 and 20 are inserted in the holes 9, pass through the corresponding holes in block 3 and plate 5 and rest on the top of the member 6. The ends 16 of the wires 12 and 13 are inserted in the holes 11. The slot 8 allows the portion 15 to pass through the plate 4 and rest on the top of plate 3. The various wires are of predetermined sizes and the dimensions of the various parts of the stem block 1 are such that all of the wires are maintained in exactly the correct relative position.

After the wires are assembled as shown a glass flare 30 which is constructed from a glass tube is placed over the ends of the wire projecting from the stem block. A glass exhaust tube 31 bent at its lower end is supported in place within the flare as shown. The flare and exhaust tube are held in place in the machine by supporting elements as shown, for example, in the patent of John A. Spencer noted above.

After the parts are assembled as shown in Figure 1, the lower part of the flare 30 is heated until it is in a plastic condition. The glass is then formed around the wires into the final shape to form the press 33 as shown in Figure 3. This may be done by the machine as shown in the Spencer Patent No. 1,896,599, noted above. During this process the end of the tube 21 is fused to the wall of the flare 30. A blast of air is then blown through the tube 31 causing the glass to be pushed away from the end of said tube leaving the exhaust opening 32.

When the glass press has been formed the stem is removed from the stem block and the wires 22, 23, 25 and 26 are given a slight bend as shown in Figure 3. Since these wires are quite small this simple bend can be made quite easily and also comparatively little strain is placed on the glass press 33. This latter fact is also partly due to the fact that these four wires are in towards the center of the press and there is a large body of glass between them and the ends of the press.

The completed stem as shown in Figure 3 is adapted to have assembled thereon an electrode structure and to be sealed into a glass bulb in accordance with the well known practice. The standards 12 and 13 are adapted to support the plate while the standards 19 and 20 are adapted to support two other points on the electrode assembly. Wires 22 and 26 are adapted to support the grid while the wires 23 and 25 are adapted to serve as the filament or cathode leads. The wire 24 is adapted to serve as an anchor for the mid point of the filament. Since the electrode structure is well known and since that structure of itself forms no part of my present invention it is not illustrated in the drawings. The bulb into which the stem is sealed may be exhausted through the tube 31.

By bending the wires before sealing them into the press it is possible to use much stiffer and heavier wire than was considered feasible before. Since the bending of these wires is not limited by the strength of the glass it is possible to use as much force as is necessary to bend them and in some cases the wires may be heated in order to facilitate the bending. By the use of heavier and stiffer wires for the supporting standards the support for the structure is made more rigid and is less likely to be disturbed by mechanical shocks.

The invention is not limited to the particular details of construction, material or specific processes described above, as many equivalents will suggest themselves to those skilled in the art. For instance, I have described my invention as applied to one particular type of vacuum tube, but it is to be understood that the invention is not to be limited to the exact structure shown. This invention can be applied to any type of tube in which wires which must be bent are sealed in a glass press. Such tubes may be electrical discharge tubes of all kinds and may have fillings of gases of various kinds of vapor. They also may be lamps of various kinds, and in fact all tubes in which bent wires sealed in a glass press are used. Although I have shown but two wires which are sealed in the tube in bent form, it is clear that as many wires may be sealed in the press in this form as may be necessary or desirable. Also the invention may be applied to the usual flat press in which said press lies in a single plane as well as to the multiple wing press structure as illustrated.

It is accordingly desired that the appended claims be given a broad interpretation commensurate with the scope of the invention within the act.

Having described my inventon, I claim:

1. In an electrical tube having a glass stem in which is sealed a wire having an electrode-engaging portion bent out of line with the portion sealed in said stem, the method of forming said stem which consists in first bending said wire to form said electrode-engaging portion out of line with the portion to be sealed in said stem and shaping said wire to its desired final form, then firmly supporting said wire and a glass member in their predetermined final relative positions, and finally forming said glass member around said wire to form a press.

2. A stem block comprising a member having a number of recesses adapted to receive a number of wires each of said recesses being proportioned to closely embrace said wires whereby they are maintained in predetermined fixed relative positions, at least one of said recesses being provided with an offset position to receive a bent portion of one of said wires.

3. A stem block having a slot in the upper end thereof, said slot being of a predetermined depth and of a width to receive closely a portion of a bent wire, said block being further provided with a hole bored therein at the bottom of said slot adjacent one end thereof.

4. In an electrical tube having a glass stem in which are sealed wires, at least one of which has an electrode-engaging portion out of line with the portion sealed in said stem, the method of forming said stem which consists in first bending said wire to form said electrode-engaging portion out of line with the portion to be sealed in said stem and forming the bent wire into its final form, then firmly supporting all of said wires and a glass member in predetermined positions such that each wire is supported in its final predetermined relative position to said glass member and the bent portions of said bent wire are supported in their final relative positions to all of said wires and to said glass member, and finally forming said glass member around said wires to seal said wires therein.

5. In an electrical tube having a glass stem in which are sealed a plurality of electrode lead-in and supporting wires, all of said wires having electrode-engaging portions, at least one of said wires being bent to form an electrode-engaging portion out of line with the portion sealed in said stem, the method of forming said stem which consists in first bending said wire to form said electrode-engaging portion out of line with the portion to be sealed in said stem and forming the bent wire into its final form, then firmly supporting all of said wires and a glass member in predetermined positions such that each wire is supported in its final predetermined relative position to said glass member, and the electrode-engaging portions of said wires are supported in their final relative position to each other and to said glass member, and finally forming said glass member around said wires to seal said wires therein.

6. In an electrical tube having a glass stem in which are sealed a plurality of electrode lead-in and supporting wires, all of said wires having electrode-engaging portions, certain of said wires being bent to displace their electrode-engaging portions, out of the plane of the other electrode-engaging portions, whereby said electrode-engaging portions lie in a plurality of planes, the method of forming said stem which consists in first bending said last-named wires to form said electrode-engaging portions out of line with the portions of said last-named wires to be sealed into said stem and forming the bent wires into their final forms, then firmly supporting all of said wires and a glass member in predetermined positions such that each wire is supported in its final predetermined relative position to said glass member, and the electrode-engaging portions of said wires are supported in their final relative position to each other and to said glass member, and finally forming said glass member around said wires to seal said wires therein.

7. A stem block for use in forming a glass stem in which are sealed wires, at least one of which is bent to form a portion out of line with the portion sealed in said stem, said block being provided with means to receive each of said wires, the means receiving said bent wire being shaped to firmly support both the portion to be sealed in the stem and the portion out of line therewith, said last-named means being located with respect to said other wire-receiving means so that the wires received in said means are all firmly supported relative to each other in their final positions and said out-of-line portion is firmly supported in its final position relative to all of said wires.

8. A device for use in forming a glass stem in which are sealed wires, at least one of which is bent to form a portion out of line with the portion sealed in said stem, said device being provided with means to support each of said wires, the means supporting said bent wire being designed to firmly support both the portion to be sealed in the stem and the portion out of line therewith, said last-named means being located with respect to said other wire-supporting means so that the wires supported by said means are all firmly supported relative to each other in their final positions, and said out-of-line portion is firmly supported in its final position relative to all of said wires.

9. In an electrical space discharge tube having a glass stem in which is sealed a wire having an electrode-supporting portion bent out of line with the portion sealed in said stem, the method of forming said stem which consists in first bending said wire to form said electrode-supporting portion out of line with the portion to be sealed in said stem and shaping said wire to its desired final form, then firmly supporting said wire and a glass member in their predetermined final relative positions, and finally forming said glass member around said wire to form a press.

PAUL V. MALLOY.